April 30, 1935.  H. H. CANTERBURY  1,999,396
OIL AND GAS SEPARATOR
Filed Dec. 24, 1931  2 Sheets-Sheet 2
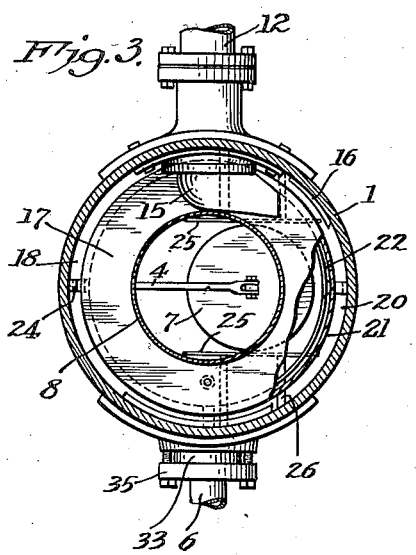
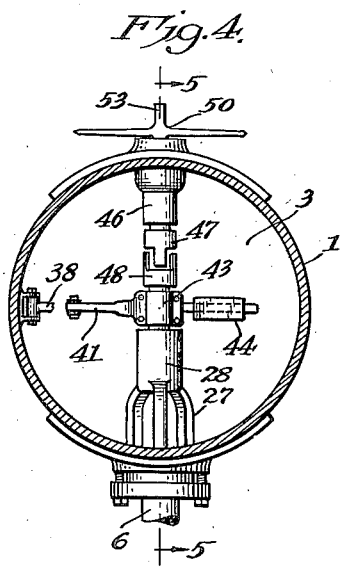
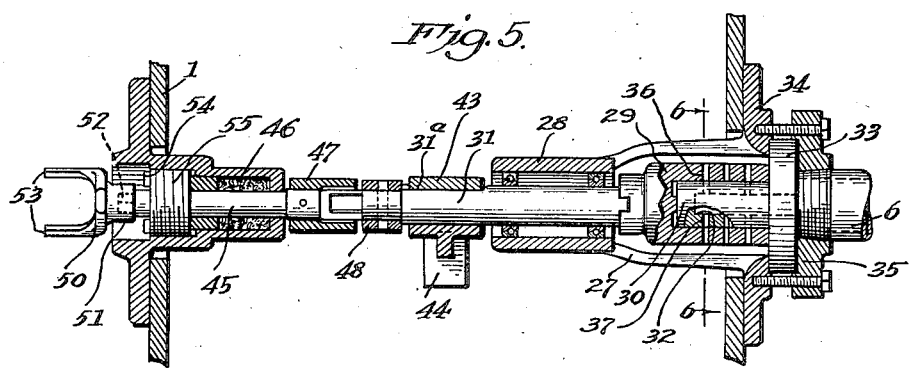
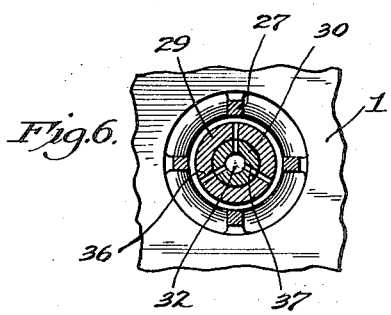
INVENTOR.
Harry H. Canterbury
BY
R. W. Smith
ATTORNEYS.

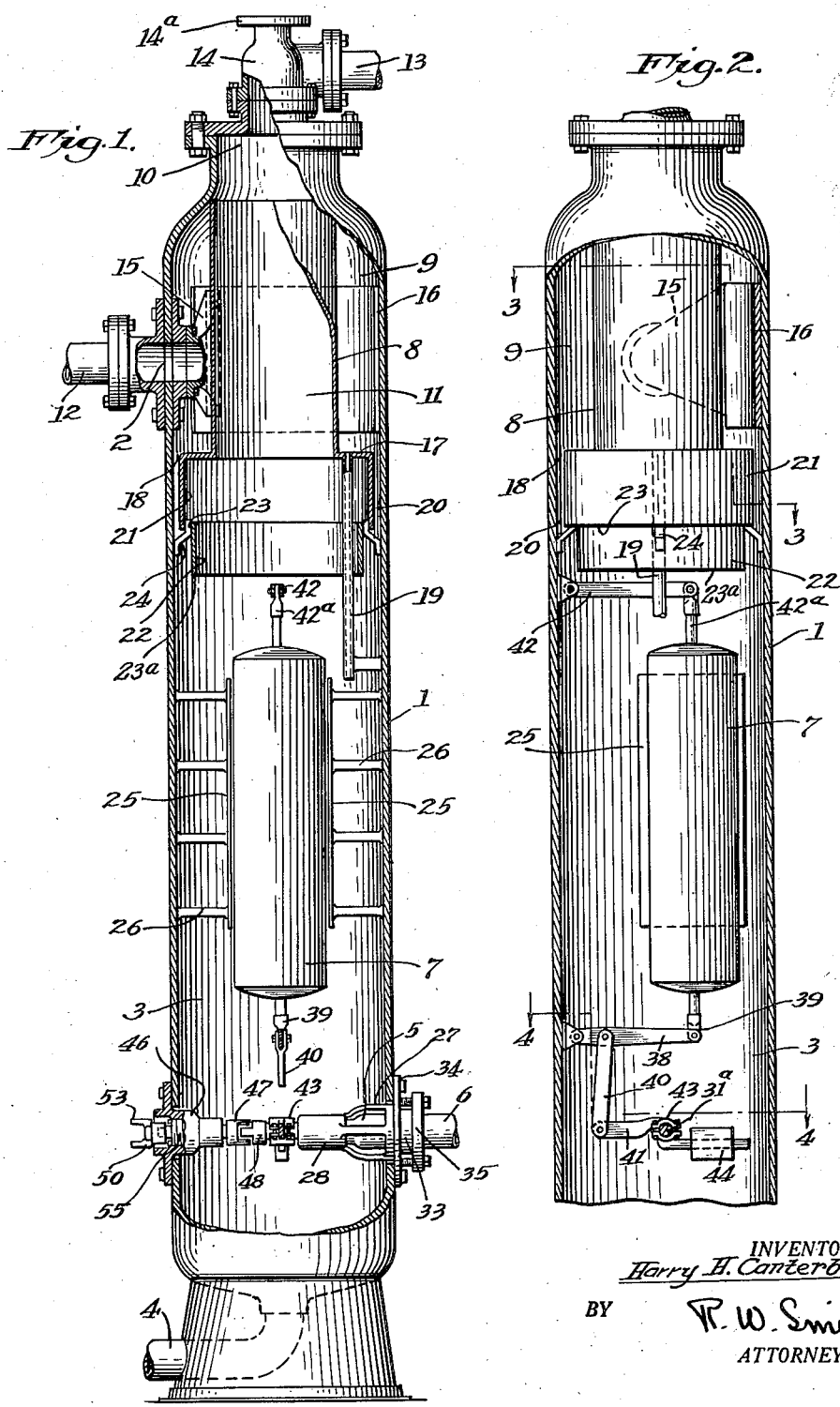

Patented Apr. 30, 1935

1,999,396

UNITED STATES PATENT OFFICE 1,999,396

OIL AND GAS SEPARATOR

Harry H. Canterbury, Whittier, Calif.

Application December 24, 1931, Serial No. 583,004

5 Claims. (Cl. 183—2.7)

This invention is an oil and gas separator, and provides improved means for separately discharging the gaseous and liquid constituents of the flow from an oil well, with the oil and gas of the incoming flow released from their original intimate association by centrifugal force and the flow then reduced to a quiescent state for separation of the gas and oil, and the gas freed of any remaining oil as it flows to the gas outlet and thereby discharging only dry gas, and the oil discharge having a valvular control regulated by the fluid level in the separator, and operated with but little friction and providing for convenient testing of its operation while the separator is in use.

It is an object of the invention to create a vacuum by the flow of the mixed oil and gas, so as to withdraw any oil remaining mixed with the gas as it flows to the gas outlet and thereby insure discharge of dry gas.

It is a further object of the invention to preferably initially circumferentially agitate the flow for centrifugal release of the intimate association of the gas and oil, and to then arrest any such rotary agitation so as to insure a quiescent condition and thereby eliminate frothing when the flow settles for separation of the gas and oil, with the means which is employed for arresting rotary agitation preferably also forming a guide for a float which regulates the valvular control for the oil discharge.

It is a still further object of the invention to provide a valvular control for the oil discharge adapted for convenient operation by a float which moves in accordance with the fluid level in the separator, and to adapt the valvular control for testing of its operation by manually actuating the same from the exterior of the separator while the separator is in use, but with the valvular control normally operated by the float without disturbing the manual actuating means which is only employed when the valvular control is to be tested, and thereby eliminating excessive friction during normal operation of the separator.

Further objects of the invention will be readily understood from the following description of the accompanying drawings, in which:

Fig. 1 is a front elevation of the separator, partly broken away in axial section.

Fig. 2 is a fragmentary side elevation, partly in axial section.

Figs. 3 and 4 are transverse sections on the lines 3—3 and 4—4 respectively of Fig. 2.

Fig. 5 is a detail vertical section on the line 5—5 of Fig. 4.

Fig. 6 is a detail transverse section on the line 6—6 of Fig. 5.

The separator comprising a preferably cylindrical upright casing 1 having an inlet 2 in its side wall adjacent its upper end, and forming a settling chamber 3 at its lower end provided with a drain 4 for sand and water. A valve 5 is mounted in the settling chamber and controls discharge of oil to a communicating and outwardly projecting oil pipe 6, and the valve is regulated by a float 7 which is adapted for vertical movement in the lower portion of casing 1 responsive to variations in the fluid level in the separator.

An annular wall 8 in the upper portion of casing 1 forms a circumferential scrubbing chamber 9 communicating with inlet 2, and a gas outlet 10 at the upper end of casing 1 communicates with an axial passageway 11 which is defined by the annular wall. A pipe 12 for the flow from an oil well communicates with inlet 2, and a gas discharge pipe 13 communicates with gas outlet 10, preferably by means of a coupling 14 which is flanged at 14a for reception of a relief valve (not shown).

The incoming flow at inlet 2 is preferably directed circumferentially around scrubbing chamber 9, and for this purpose a tangential nozzle 15 communicates with the flow inlet and discharges into the scrubbing chamber as shown in Figs. 1 and 3, with a wear plate 16 preferably positioned just beyond the nozzle and extending at least part way around the annular scrubbing chamber at its outer periphery. The entire flow is thus circumferentially agitated so that the oil and gas are released from their initial intimate association by centrifugal force; and the upper end of wall 8 merges into the wall of casing 1 so as to close the upper end of the scrubbing chamber, while the lower end of the annular wall terminates in an outwardly projecting radial flange 17 below nozzle 15 and terminating just short of the wall of casing 1 so as to form an annular outlet 18, whereby the flow after its rotary agitation in the scrubbing chamber gravitates to settling chamber 3 for separation of the oil and gas. Any constituents of the flow which are not centrifugally forced to the outer periphery of the scrubbing chamber for discharge at outlet 18, may gravitate to the settling chamber through a vertical drain pipe 19 which preferably depends from flange 17 and communicates with the scrubbing chamber adjacent its inner periphery.

The oil and gas separate in the settling chamber, with the gas rising through passageway 11 for discharge at the gas outlet 10; and suction is adapted to withdraw any oil remaining mixed with the gas as it flows to its outlet, preferably by creating a vacuum by jet action of the gravitational flow from the scrubbing chamber to the settling chamber. For this purpose the flange 17 preferably terminates in an outer peripheral depending wall defining a restricted annular space 20 constituting a nozzle or passageway for an impelling fluid, i. e. the flow gravitating to the settling chamber; and the depending annular wall includes an upper sleeve 21 and an inwardly spaced and telescopically depending lower sleeve 22 forming an annular induction passageway or slot 23 between the sleeves, interrupted only at circumferentially spaced brackets 24 and communicating at its respective ends with passageways 11 and 20, with the end of the slot which communicates with passageway 20 opening into said passageway in the direction of gravitational flow of the impelling jet, whereby the impelling jet by its flow downward past the lower edge of sleeve 21, moves past the open end of the induction slot in such direction relative thereto as not to enter the slot, but in such proximity thereto as to entrain the fluid therein and draw the same downwardly through passageway 20 along with the impelling fluid. The flow, gravitating through the restricted annular space 20 and being still subject to the rotary agitation set up in the scrubbing chamber, thus creates a vacuum at slot 23, and as soon as the gravitating flow passes the lip 23ª which is formed by the lower edge of sleeve 22, the gas rising through passageway 11 tends to whip the gaseous constituents of the gravitating flow around the lip, thereby separating gas from the oil. The gas which is thus separated from the oil ascends through passageway 11, and being still subject to the rotary agitation which has been produced in scrubbing chamber 9, causes any oil remaining mixed with the gas to be thrown outwardly by centrifugal force, and as the ascending flow passes the slot 23, the vacuum at said slot withdraws the oil which has been centrifugally forced to the outer periphery of the ascending flow, thereby separating this oil from the ascending gas and returning it to the settling chamber 3. The gas which is eventually discharged at the outlet 10 is thus a dry gas from which the oil has been separated; and while any oil which is withdrawn at slot 23 is returned to the mixed flow gravitating to the settling chamber, this in no way affects the ultimate separate withdrawal of gas and oil, since the oil returned to the mixed flow has already been released from its intimate association with the gas, and the continued rotary agitation in annular space 20 prevents any further intimate association, so that when the flow reaches the settling chamber it is in a condition for ready stratification of the oil and gas, merely by retaining the flow in the settling chamber.

Rotary agitation of the flow which gravitates to the settling chamber is preferably arrested so that the flow may collect in a quiescent state for eliminating frothing and adapting the oil and gas for ready separation; and the means employed for arresting rotary agitation may also form a guide for the float 7, by mounting plates 25 in casing 1 on brackets 26, with the plates transversely spaced as shown in Fig. 3 so as to form a guideway in which float 7 is adapted to slide, and with the plates of a length to maintain guiding contact with opposite sides of the float throughout the range of travel of the latter, and with the plates extending transversely of the casing 1 to points adjacent its peripheral wall so as to form baffles for arresting circumferential agitation of substantially all the downwardly gravitating flow which tends to rotate at the outer peripheral portion of casing 1, while permitting unobstructed rise of gas through the center of the casing to passageway 11. The baffle plates 25 are adapted to arrest rotary agitation of the entire body of liquid which collects in the settling chamber, and for this purpose the baffle plates are of a length whereby their upper ends are approximately in transverse alinement with the upper end of the float when the latter is in normal position as shown at Fig. 1, so that the baffle plates extend upwardly to at least the liquid level in the settling chamber, and thus arrest rotary agitation of the flow when it first mixes with the body of liquid in the settling chamber.

The float regulated oil discharge valve 5 is preferably positioned within the casing 1 so that the operating connection between the float and valve need not project exteriorly of the casing; and for this purpose a bracket 27 may project laterally into casing 1 and terminate in a bearing 28, with the valve 5 comprising cooperating telescopic sleeves 29—30 adapted for relative rotation to open or close the valve, and having the outer sleeve 29 connected to a valve stem 31 which is journaled in bearing 28 for oscillation by vertical movement of float 7, while the inner sleeve 30 projects to the exterior of casing 1 for communication of its bore 32 with oil pipe 6. The outer end of sleeve 30 may be engaged by a head 33 which is received against a flange 34 of bracket 27 resting against the exterior surface of the wall of casing 1, and a coupling flange 35 for the pipe 6 overlies the head 33 and is connected to flange 34 for securing the parts in assembled relation.

The sleeves 29—30 have radial ports 36—37, and the bore 32 of sleeve 30 terminates short of its inner end, so that when ports 36—37 are non-alined flow of oil from settling chamber 3 to the bore 32 is shut-off, while alinement of said ports opens the settling chamber to bore 32 and thence to the oil discharge pipe 6. The operating connection between float 7 and valve stem 31 whereby valve 5 is thus opened and closed responsive to movement of the float, preferably comprises a rocker arm 38 pivoted in casing 1 below the float and connected thereto as shown at 39, with a link 40 depending from the rocker arm and connected to a lever 41 which is fixed to valve stem 31; and the float may be held in upright position by a second rocker arm 42 pivoted in casing 1 above the float and connected thereto as shown at 42ª. The lever 41 may be fixed to valve stem 31 by providing the lever with a split head 43 having a non-circular bore adapted to engage a corresponding cross-sectionally non-circular portion 31ª of the valve stem, so that the valve stem is oscillated responsive to movement of the lever; and the lever is preferably adjustably counterweighted as shown at 44 in order that the valve 5 may readily open and close responsive to the movement of the float.

Means are preferably provided for manually testing the operation of valve 5 from the exterior of casing 1 while the separator is in use, but with the manual actuating means inoperative during normal operation of the separator so as to avoid excessive friction. For this purpose a stem 45 is journaled in casing 1 in longitudinal alinement with valve stem 31 and projects outwardly through the wall of casing 1 diametrically opposite the oil pipe 6, with a packing gland 46 which is mounted on the exterior surface of the wall of casing 1 adapted to receive the outwardly projecting end of the stem. A lost-motion rotary connection is provided at the proximate ends of stems 45—31, and comprises appreciably circumferentially spaced cooperating clutch elements 47—48 whereby the movement of float 7 is adapted to rock the stem 31 for opening and closing valve 5 without rotating the stem 45, while manual engagement of the outer end of stem 45 permits it being rotated so as to take up the lost-motion at clutch elements 47—48 and thereby rotate stem 31 for testing the operation of valve 5.

The stem 45 may be rotated by a wrench 50 which has a socket 51 adapted to detachably engage a head 52 at the outer end of the stem; and the opposite end of the wrench preferably forms diametrically opposite lugs 53 which by reversing the wrench are adapted to engage a cooperating slot 54 in the follower nut 55 of packing gland 46, in order that the same wrench may be used for manually rotating stem 45 and tightening its packing.

The invention thus provides an efficient gas and oil separator, with the flow reduced to a quiescent state for separation of gas and oil, and the gas freed of any remaining oil as it rises to the gas outlet, and the oil discharge controlled by a valve which has a simple operating connection for regulating the valve by the fluid level in the separator, and which may be manually tested while the separator is in use, but with said manual testing means inoperative during normal use of the separator so as to avoid excessive friction.

I claim:

1. In an oil and gas separator, a flow inlet, a settling chamber below the flow inlet, an annular wall in the separator, a flow passageway in the separator exteriorly of said annular wall and communicating with the flow inlet and opening at its lower end into the settling chamber, and a gas passageway in the separator defined by the annular wall and open at its lower end to the settling chamber, the annular wall having a restricted induction slot opening therethrough from the gas passageway to the flow passageway, with the end of the slot which communicates with the flow passageway opening into said passageway in the direction of downward flow through said passageway, whereby said downward flow constitutes an impelling jet moving past the end of the induction slot in such direction relative thereto as not to enter the slot but in such proximity thereto as to entrain the fluid in the induction slot and thus create suction at said slot for withdrawing oil from the gas passageway.

2. In an oil and gas separator, a flow inlet, a settling chamber below the flow inlet, an annular wall in the separator, a flow passageway in the separator exteriorly of said annular wall and communicating with the flow inlet and opening at its lower end into the settling chamber, and a gas passageway in the separator defined by the annular wall and open at its lower end to the settling chamber, the annular wall comprising radially spaced telescopic sleeves with the inner sleeve depending from the outer sleeve and forming a restricted annular slot between the sleeves adapted for withdrawal of oil from the gas passageway by suction created at said slot by downward flow through the flow passageway.

3. In an oil and gas separator, a flow inlet, a settling chamber below the flow inlet, an annular wall in the separator, an annular scrubbing chamber in the separator exteriorly of said annular wall and communicating with the flow inlet, a gas passageway in the separator defined by the annular wall and open at its lower end to the settling chamber, the annular wall including an outwardly projecting flange terminating just short of the wall of the separator so as to close the bottom of the scrubbing chamber except for a restricted annular flow passageway at the wall of the separator and communicating with the settling chamber, and said annular wall also including radially spaced telescopic sleeves with the upper sleeve depending from the outer periphery of the flange and the inner sleeve depending from the outer sleeve and forming a restricted annular slot between the sleeves adapted for withdrawal of oil from the gas passageway by suction created at said slot by downward flow through the flow passageway.

4. In an oil and gas separator, a flow inlet, means for circumferentially agitating the flow, a valve controlled outlet, a float controlling the valve, a rocker arm support for the float adapting it for composite vertical and lateral movement, and transversely spaced plates having opposed parallel faces forming bearing guides for the float at opposite sides thereof, the plates being so positioned as to interrupt circumferential agitation of the flow.

5. In an oil and gas separator, a flow inlet, means for circumferentially agitating the flow, a valve controlled outlet, a float controlling the valve, and transversely spaced plates having opposed parallel faces forming bearing guides for the float at opposite sides thereof, the plates being so positioned as to interrupt circumferential agitation of the flow.

HARRY H. CANTERBURY.